J. F. O'CONNOR.
FRICTION SHOCK ABSORBING MECHANISM.
APPLICATION FILED MAR. 25, 1920.
1,397,229.
Patented Nov. 15, 1921.
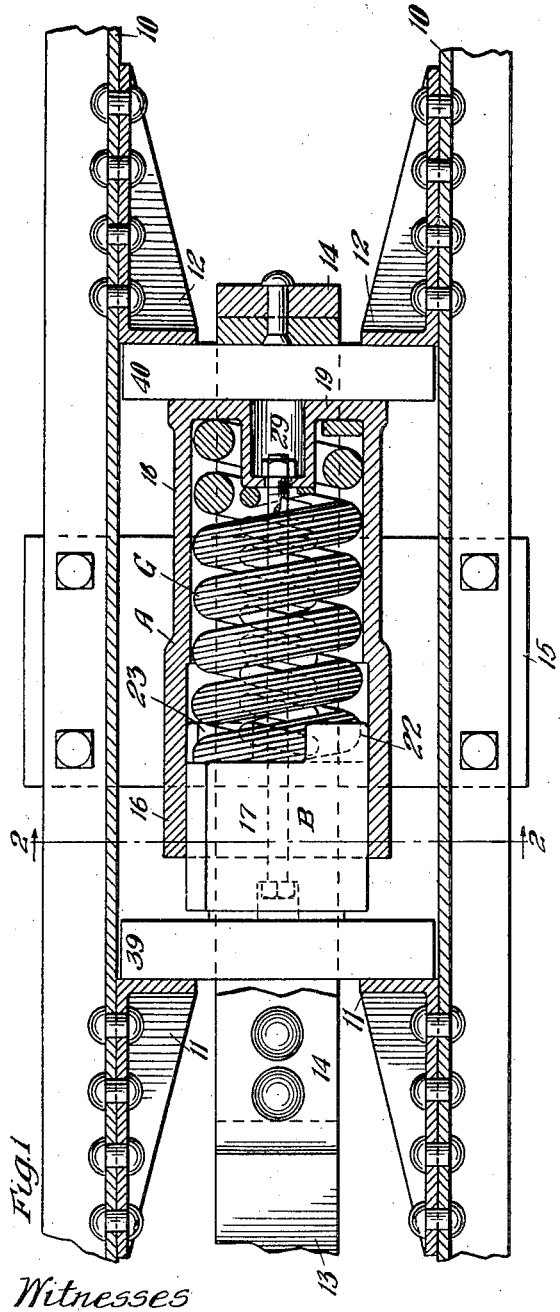
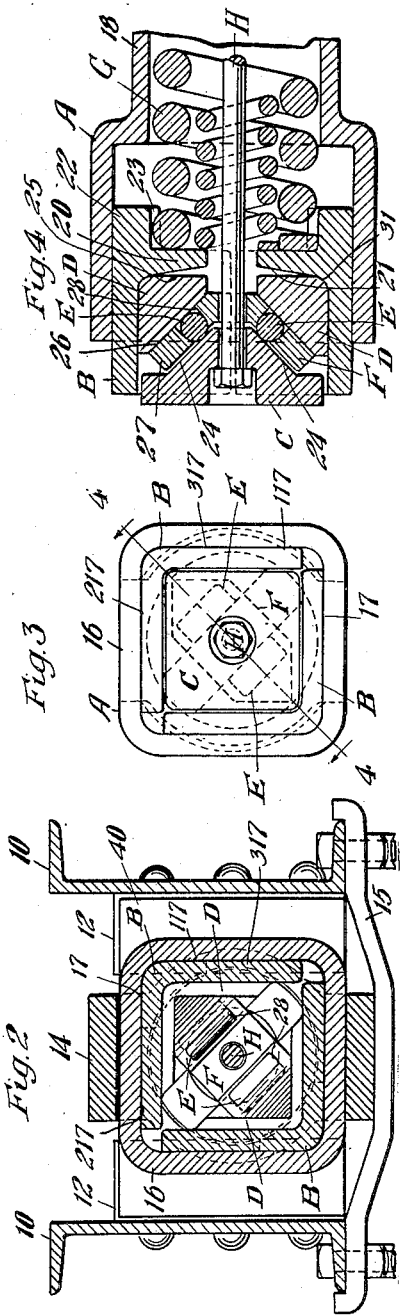
Witnesses
Wm. Geiger
Inventor
John F. O'Connor
By Geo. D. Haight
His Atty

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,397,229.  Specification of Letters Patent.  Patented Nov. 15, 1921.

Application filed March 25, 1920. Serial No. 368,668.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained high capacity and certain release.

A more specific object of the invention is to provide a friction shock absorbing mechanism employing a friction shell, friction shoes, spreader or wedge and anti-friction rollers wherein all roller bearing surfaces and friction surfaces are made plain or flat to thereby simplify and cheapen the finishing and proper fitting of the parts.

In the drawing forming a part of this specification, Figure 1 is a horizontal longitudinal sectional view of a portion of a railway draft rigging, showing my improvements in connection therewith. Fig. 2 is a vertical transverse sectional view taken substantially on the line 2—2 of Fig. 1. Fig. 3 is an end elevation of the shock absorbing mechanism proper. And Fig. 4 is a longitudinal sectional view of a part of the shock absorbing mechanism proper and corresponding to the line 4—4 of Fig. 3.

In said drawing, 10—10 denote channel-shaped center or draft sills of a railway car to the inner faces of which are secured front stop lugs 11 and rear stop lugs 12. A portion of the drawbar is indicated at 13, the same being operatively associated with the shock absorbing mechanism proper, by any suitable means such as the yoke 14 of well-known form. All of the parts are adapted to be supported by a detachable saddle plate 15. A front follower 39 and a rear follower 40 are included within the yoke and between which the shock absorbing mechanism proper is disposed.

The shock absorbing mechanism proper, as shown, comprises, broadly, a casting A which combines a friction shell and spring cage; a pair of main or friction shoes proper B—B; a wedge or spreader C; auxiliary shoes or blocks D—D; anti-friction rollers E—E; a combined roller spacing and centering member F; a spring resistance G; and a retaining bolt H.

The casting A is provided at its forward or outer end with a friction shell proper designated by the reference 16, the cross section of said shell, in the form shown in the drawing, being substantially square and thereby providing four friction surfaces extending parallel to the center line of the mechanism, said surfaces being arranged in two sets, each set comprising two friction surfaces 17 and 117 arranged at substantially right angles to each other. Rearwardly of the shell 16, the casting A is of generally cylindrical form as indicated at 18 so as to properly center the spring resistance and at its rear end, the casting A is formed with an integral wall 19 adapted to abut the rear follower 40.

Each shoe B is provided on its exterior with two friction surfaces 217 and 317 arranged at substantially right angles to each other and coöperating respectively with the friction surfaces 17 and 117. On its interior, each shoe B is provided with an inwardly extended flange 20 adapted to form a bearing for the outer end of the spring resistance G. The outer sides of the flange 20 are beveled or inclined rearwardly and inwardly as indicated at 21, so as to form an angle greater than a right angle between the flange and the main part of the shoe, as clearly indicated in Fig. 4. Rearwardly of the flange 20, each shoe B is provided with an extension 22 having the outer faces thereof coinciding with the faces 217 and 317 but on its interior curved as indicated at 23 so as to center the forward end of the spring resistance G.

The wedge or spreader C is preferably in the form of a casting and normally extended slightly beyond the outer ends of the shoes B. Said spreader C is provided with a pair of inclined wedge faces 24—24 so disposed that they extend transversely of or perpendicular to a diagonal of the friction shell, as will be apparent from an inspection of Fig. 2.

The auxiliary shoes or blocks D are two in number, one for each shoe B. Each block D is of substantially right angled triangular cross section in a plane parallel to the axis of the mechanism as shown in Fig. 4. This allows the inner transversely extending face of said block, indicated at 25, to be normally spaced from the face 21 of the corresponding flange 20. The inner inclined or wedge face 26 of the block D extends substantially parallel to the opposed wedge face 24 of the spreader C.

The anti-friction rollers E are two in number, one roller being interposed between a set of opposed wedge faces 24 and 26 of the spreader C and one block D, as shown in Fig. 4. The roller spacer and retainer F is in the form of a cap adapted to fit over the spreader C and the thickness of the flanges 27—27 is made slightly less than the diameter of the rollers. Said flanges 27 are slotted, as indicated at 28—28 to accommodate the rollers and at the same time prevent them from being displaced.

The retaining bolt extends through alined perforations in the spreader C, member F and inwardly extended boss 29 at the rear end of the casting A and, as will be understood by those skilled in the art, holds the parts in assembled relation and the spring resistance under initial compression, if desired.

All of the friction surfaces 17, 117, 217 and 317 are made plain or flat as are also the wedge faces 24 and 26. With this arrangement, it is evident that all of said faces may be rough finished on ordinary grinders at minimum expense. The relation between the blocks D and main shoes B, heretofore described, is such that the opposed contacting faces of these elements may be left flat or plain and in the event there is any inequality in any of the parts, it is evident that the blocks D are adapted to adjust themselves by tilting on the main shoes B. To facilitate this, the corners of the blocks D are rounded and the adjacent parts of the shoes are filleted, as indicated at 31.

With the construction shown, not only is the cost of manufacture materially reduced, as compared with many other types of friction mechanisms on the market, but in addition it will be noted that a large frictional wearing area is obtained on all four interior sides of the shell. By arranging the wedge and shoes as described, it is evident that an additional wedging action is obtainable between the shoes and the shell because of the diagonally disposed outward thrusts from the spreader.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell having interior longitudinally extending flat friction surfaces, said surfaces being arranged in sets and each set comprising two surfaces disposed at an angle to each other; of friction shoes coöperable with the shell, each shoe having two outer flat friction surfaces coöperable with the friction surfaces of one of said sets; spring means to yieldingly resist relative movement between the shell and shoes; a pressure-transmitting spreader; auxiliary shoe blocks detachably associated with each of said shoes on the inner sides of the latter and having shouldered engagement therewith, said shouldered engagement being so arranged as to permit relative movement between the blocks and said shoes, said blocks and spreader having opposed sets of wedging faces; and an anti-friction roller interposed between each of said sets of wedging faces.

2. In a friction shock absorbing mechanism, the combination with a friction shell having interior longitudinally extending flat friction surfaces, said surfaces being arranged in sets and each set comprising two surfaces disposed at an angle to each other; of friction shoes coöperable with the shell, each shoe having two outer flat friction surfaces coöperable with the friction surfaces of one of said sets; spring means to yieldingly resist relative movement between the shell and shoes; a pressure-transmitting spreader; auxiliary shoe blocks detachably associated with each of said shoes on the inner sides of the latter and having shouldered engagement therewith, said shouldered engagement being so arranged as to permit relative movement between the blocks and said shoes, said blocks and spreader having opposed sets of wedging faces; an anti-friction roller interposed between each of said sets of wedging faces; and a slotted retainer for the anti-friction rollers extending between said spreader and blocks.

3. In a friction shock absorbing mechanism, the combination with a friction shell; of friction shoes coöperable with said shell; each shoe having an inwardly extended flange, the outer surface of which extends at an angle greater than a right angle relatively to the inner face of the main part of the shoe; of a block associated with each of said shoes and normally bearing against the latter in the angle between said flange and main part of the shoe and adapted to tilt to a limited extent within said angle of the shoe, said block having an inner wedge face; spring means for resisting relative movement between the shoes and shell; a pressure-transmitting spreader having wedge faces corresponding in number and opposed to said wedge faces of the blocks; and antifriction rollers interposed between corresponding sets of wedge faces on the blocks and spreader.

4. In a friction shock absorbing mechanism, the combination with a friction shell having an interior of substantially rectangular cross section and flat friction surfaces therein extending substantially parallel to the axis of the shell; of a pair of friction shoes coöperable with said shell, each shoe having a pair of outer friction surfaces arranged substantially at right angles to each other and coöperable with two adjacent friction surfaces of the shell; spring means for yieldingly resisting relative movement between the shoes and shell; a pair of blocks, one associated with each shoe on the interior thereof, said blocks having shouldered engagement with the shoes and each provided with an inner wedge face; a pressure-transmitting spreader having wedge faces opposed to the wedge faces of the blocks; antifriction rollers interposed between the wedge faces of the blocks and spreader; and means for retaining said rollers in proper position.

In witness that I claim the foregoing I have hereunto subscribed my name this 16th day of March, 1920.

JOHN F. O'CONNOR.

Witness:
CARRIE GAILING.